Patented Feb. 22, 1938

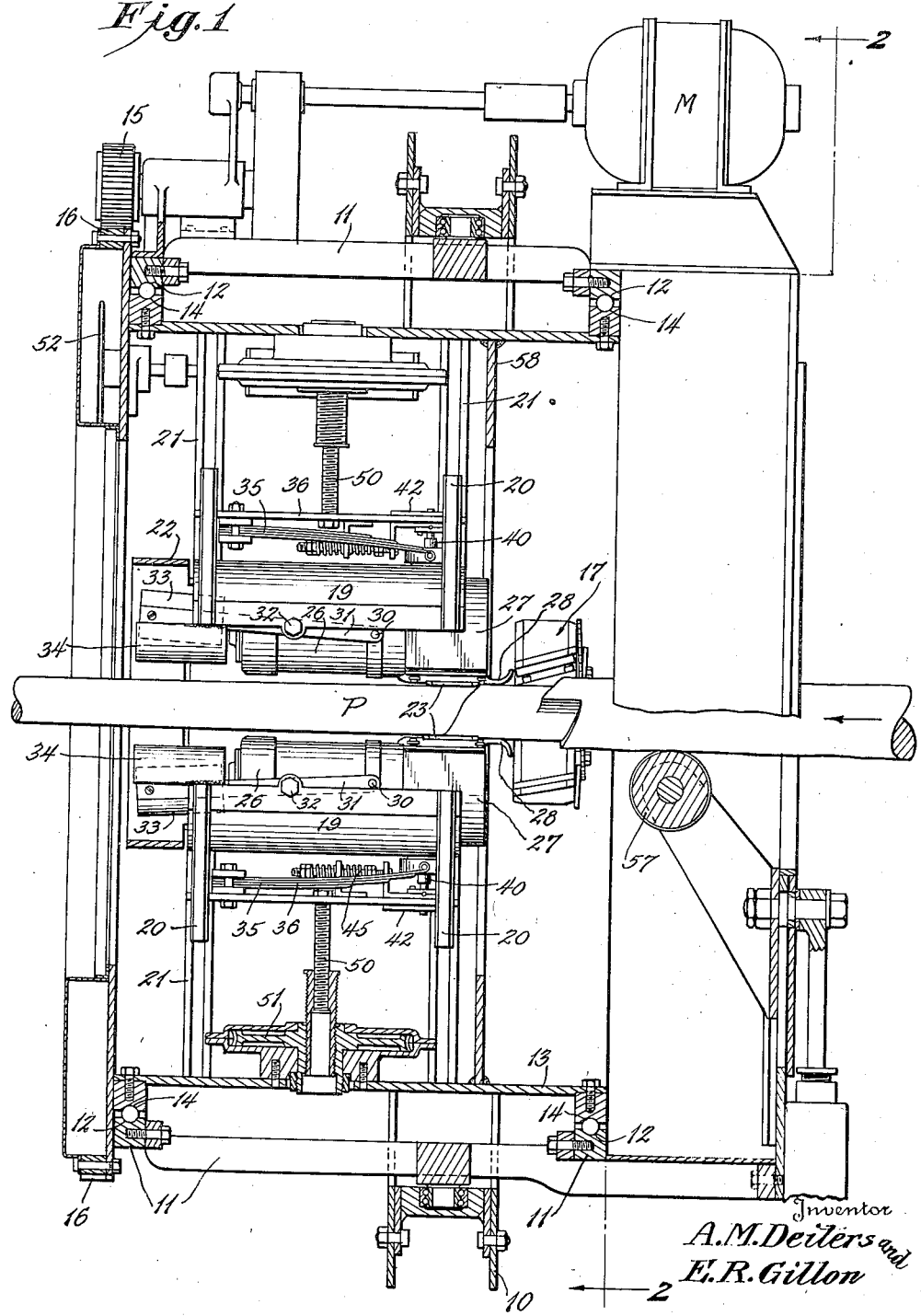

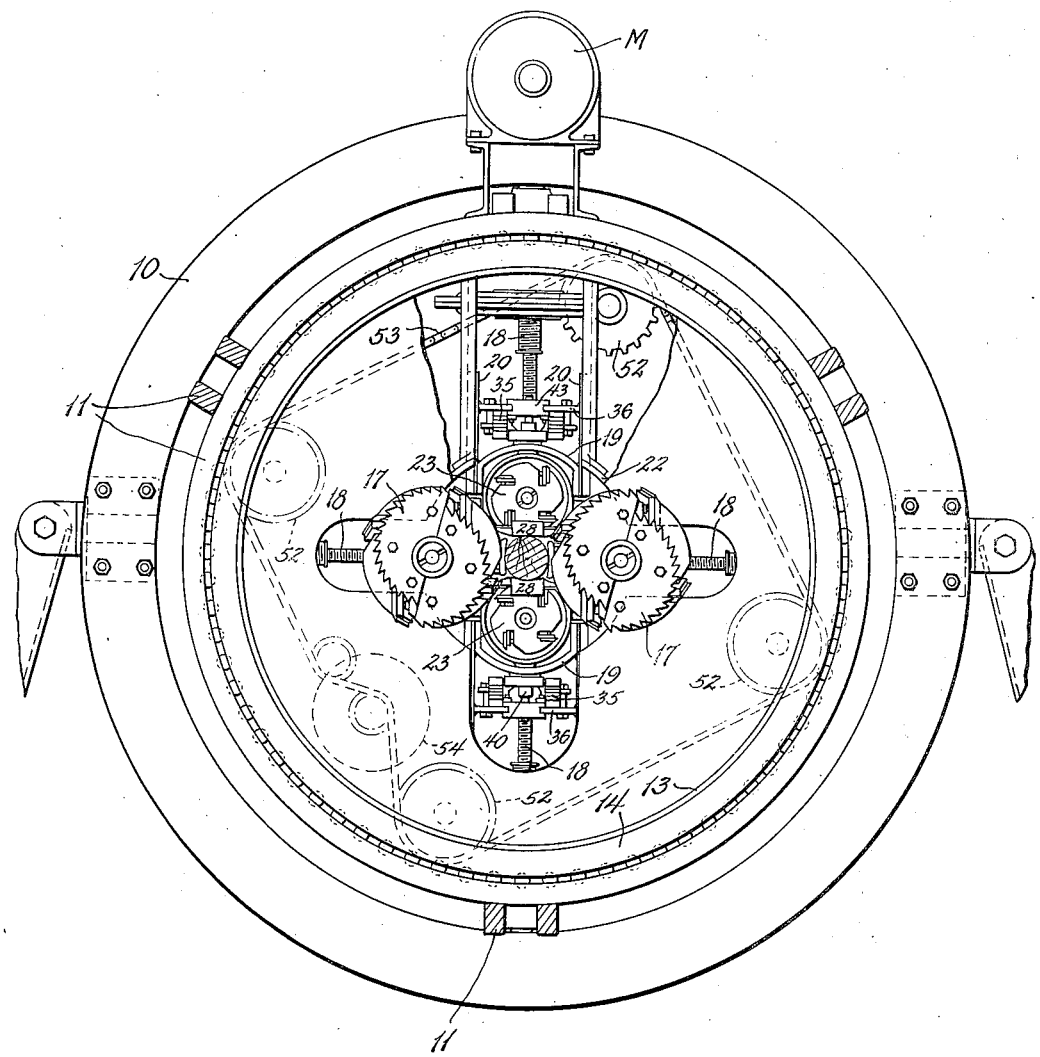

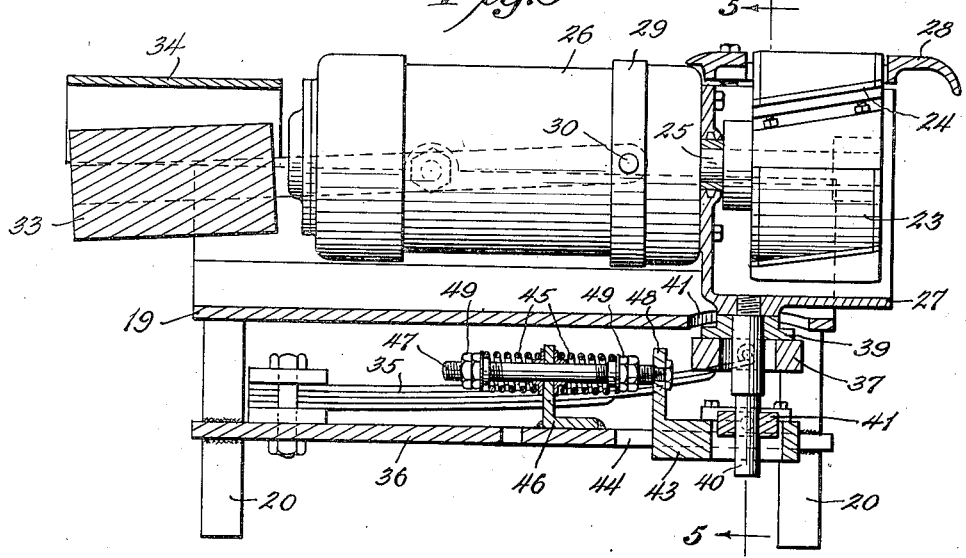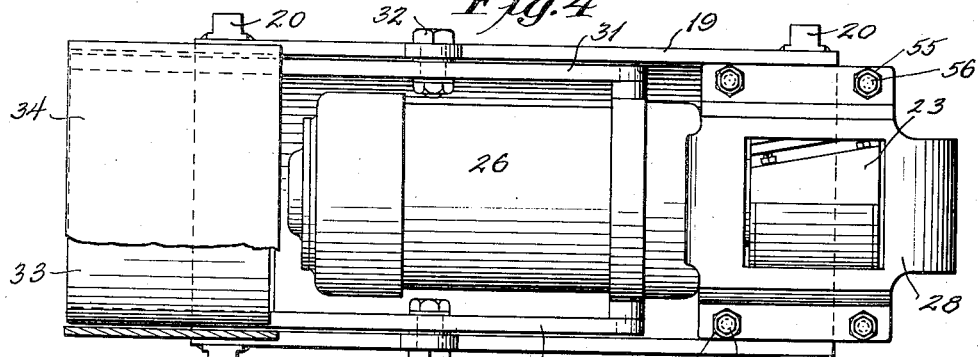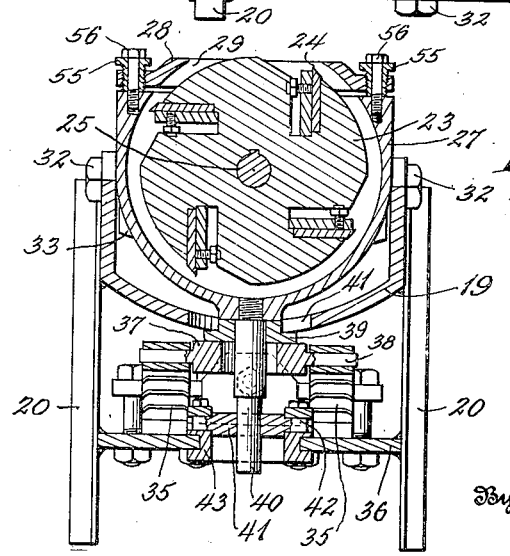

2,109,414

UNITED STATES PATENT OFFICE 2,109,414

CUTTER FOR POLE SHAPING MACHINES

August M. Deiters, Atlanta, and Elam R. Gillon, East Point, Ga., assignors to Southern Wood Preserving Company, Atlanta, Ga., a corporation of Georgia Application January 11, 1937, Serial No. 120,104

13 Claims. (Cl. 142—54)

This invention relates to pole shaping machines of the general type shown in U. S. Patent 1,943,649 and, among other objects, aims to provide novel counterbalanced rotary cutters for shaping or trimming large poles having irregularities or sweeps. The main idea is to provide rotary finishing cutters which rotate about their own axes, as well as bodily about the axis of a pole and having provision to follow irregularities in contour around the pole. Further, the invention aims to provide counterbalancing means to overcome the effect of gravity and centrifugal force on the cutters, and thereby permit the cutters to cut to a substantially uniform depth both on the upper and lower sides of the pole.

Other aims and advantages of the invention will appear in the specification, when considered in connection with the accompanying drawings, wherein:

Fig. 1 is a vertical, sectional view, partly in elevation, showing the preferred form of cutters applied to a pole shaping machine;

Fig. 2 is a sectional view taken on the line 2—2 of Fig. 1;

Fig. 3 is a vertical, sectional view, partly in elevation, showing a cutter assembly removed from the machine;

Fig. 4 is a top plan view of the cutter assembly shown in Fig. 3; and

Fig. 5 is a sectional view taken on the line 5—5 of Fig. 3.

Referring particularly to the drawings, the cutters there shown are mounted in a pole shaping machine somewhat similar to that disclosed in Patent No. 1,943,649 wherein poles are fed longitudinally through the machine and cutters are mounted within a rotatable drum to rotate about their own axes and also bodily with the drum about the axis of a pole. Such cutters are incapable of following irregular circumferential contours on the surface of a pole. In other words, they remove too much wood at the high spots and too little or none at all at the low spots around the surface. In accordance with the present invention, the cutters are designed to follow such irregularities and to cut to a substantially uniform depth around the pole, both at the top and the bottom. Two such cutters are shown in the present example, and they are mounted for movement in radial planes, being normally held in cutting engagement with the pole by powerful springs. The cutter assemblies are counterbalanced to prevent centrifugal force and gravity from causing them to move radially toward or away from the pole as they pass around the top and bottom portions of the pole.

In Figs. 1 and 2, the machine is shown as including a special design of gimbal ring in the form of a main supporting frame 10, within which is pivotally mounted a second supporting frame or inner gimbal 11 carrying annular raceways 12. A drum or casing 13 having complemental raceways 14 is rotatably mounted within the main frame. The drum is shown as being driven by a motor M through suitable reduction gearing including a pinion 15 meshing with an external ring gear 16 on the rear end of the drum. The mounting of the drum 13 is such that it is capable of floating movement. That is to say, it is universally movable both angularly and laterally to follow the sweeps in a pole as it is fed through the machine by the feeding mechanism (not shown). These parts may be and preferably are the same as those disclosed in the aforesaid patent, except for the fact that the driving motor M is mounted on top of the inner gimbal instead of within the drum.

In this instance, the counterbalanced cutters will be described as cooperating with roughing cutters 17 which are designed to turn down the poles approximately to the desired diameter. In other words, the counterbalanced cutters are especially designed to finish off the poles and produce a smooth surface behind the roughing cutters and smooth out the surface in depressions. Incidentally, the roughing cutters are confined to move in a varying circular path around a pole to produce the desired taper, while the finishing cutters are designed additionally to follow the irregular contours around the circumferential surface of a pole caused by knots, depressions and the like. The roughing cutters shown herein are being made the subject of a separate application, Serial Number 120,105, filed Jan. 11, 1937. It is sufficient here to state that they are mounted to be fed inwardly and outwardly toward and away from the axis of a pole by the feed screws 18 which are operated in substantially the same manner as shown in the aforesaid patent.

In accordance with the present invention, the finishing cutters are mounted on diametrically opposite sides of a pole being carried by crosshead frames consisting of channel members 19 to which are secured guiding legs 20 near the four corners slidably mounted in channel-shaped guide frames 21 projecting inwardly from the inside of the drum 13 and connected at their inner ends to a smaller drum 22 which is cut out or slotted at its sides to accommodate the cutters and frames and permit the cutters to be projected inwardly a sufficient distance to operate on a small pole. Each of the finishing cutters is shown as including a cutter head 23 carrying cutter knives or blades 24 and mounted on the shaft 25 of a motor 26. The cutter head is enclosed within a housing 27 which is shown as being open at its top and forward end. This housing is secured at its rear end to the forward end of the motor housing and carries an adjustable pole guiding shoe 28 having an opening 29 through which the cutter blades project as the cutter head rotates. There is shown a band 29 around the motor housing near the center of gravity of the motor and cutter assembly and this band has trunnions 30 on diametrically opposite sides to which are connected a pair of pivoted links 31 mounted on pivot bolts 32 extending through opposite sides of the channel 19 behind the trunnions 30. These links serve as counterbalancing levers carrying a counterweight 33 between their rear ends which balances or nearly balances the cutter and motor assembly with respect to the pivot bolts 32. The counterweight 33 is mounted to move radially with respect to a pole within a guard or shield 34 between it and the pole.

The cutter is normally held in the position shown in Figs. 1 and 3 by means of a pair of cantilever or leaf springs 35 secured at their rear ends to a plate or shelf 36 which is welded or otherwise secured to the guiding legs 20 below the channel 19 and pivotally connected at their forward ends to a washer-shaped member 37 having trunnions 38. The washer member in turn bears against the bottom portion of the cutter housing 27 through a second washer 39 carried by a guide pin 40 projecting downwardly through an opening 41 in the channel 19. The washer member has an enlarged opening around the pin to permit relative movement between the pin and washer member as the springs are compressed. The arrangement is such that the cantilever springs hold the cutter in engagement with the work and exert a uniform pressure on it, so that it will take a cut of substantially uniform depth around the surface of the pole. However, the cutters can yield when they strike high places on the surface of a pole and will be forced radially inwardly toward the pole when they strike low places on the surface.

The guiding pin 40 is employed to maintain the cutting edges of the cutter blades substantially parallel with the axis of a pole when the cutter head moves inwardly or outwardly about the pivot bolts 32 and the trunnions 30. In other words, the whole motor and cutter assembly are confined by the guide pin to move with their axis substantially parallel with the axis of the pole at all times. For this purpose, the guide pin 40 projects through and has a sliding fit in a block 41 shown as having trunnions 42 journaled in a crosshead member 43 which is slidably mounted in a notch or slot 44 in the shelf 36. This crosshead form a part of a double acting shock absorber or buffer which comprises a pair of opposed compression springs 45 on opposite sides of an angle bracket 46 welded to the shelf 36 and mounted on an adjustable bolt or rod 47 which extends through an upstanding arm or flange 48 on the crosshead 43. The arrangement is such that the compression of the springs can be adjusted by ordinary adjusting and lock nuts 49 at opposite end portions of the bolt or rod. As the cutter head tends to swing either inwardly or outwardly about its pivot suspension, the guide pin 40 constrains it to move radially in a straight line. While the cutter is held in engagement with the work by the action of the cantilever springs 35, it tends to tilt about the trunnion pivots 30, thereby tending to tilt the guide pin 40 clockwise. This tilting movement is resisted by the right hand shock absorber spring 45. Any tendency to tilt in the opposite direction is resisted by the left hand shock absorber spring. These springs also return the guide pin to its normal position when the cutter engages an irregular surface on a pole.

The two finishing cutters shown in Fig. 1 are fed automatically to engage a pole and cut the desired taper by mechanism quite similar to that shown in the aforesaid patent. Feed screws 50 are secured to the cutter supporting frames or the respective shelves 36 thereon and are operated by reduction gears 51 which are shown as being driven by a series of sprockets 52 journaled in brackets within the drum over which a driving chain 53 is trained and this chain is driven by a control motor 54 which is properly timed or synchronized with respect to the longitudinal feeding speed of the pole. Incidentally, the feed screws 18 for the roughing cutters are adapted to be operated by two of the sprockets 52 which are connected to drive worm gearing like the reduction gears 51 so that both sets of cutters are fed inwardly and outwardly in unison.

It will be understood that the depth of the cut is controlled by the preliminary setting or adjustment of the cutters, especially the positions of the roughing cutters. The finishing cutters, in the present example, are intended merely to take a shallow cut and leave the surface of the poles relatively smooth. The depth of the cuts taken by the finishing cutters is controlled by the positions of the guide shoes 28 with respect to the cutter blades which project through the openings 29 in the shoes. These shoes have bent forward ends or guide horns and ride on the surface left by the roughing cutters. They serve as depth gauges for the finishing cutters. The adjustments are shown as being made by means of screw threaded spacer bushings 55 projecting through the shoes 28 at the four corners and resting on the top surface of the housing 27 and they are secured in adjusted positions thereon by means of ordinary stud bolts 56 projecting through the bushings and screw threaded into the housing. By turning the bushings, after loosening the stud bolts, the shoes or guides may be properly adjusted and again secured in place.

In Fig. 1, a pole P, such as a telegraph pole, is shown as being fed through the machine. It is fed substantially horizontally into the machine and held against rotation by feeding means, such as that described in the aforesaid patent. At the pole-entering end of the machine a plurality of fluid pressure operated gripping and guiding rollers 57 engage the pole, three such rollers being used for this purpose. These rollers guide the pole between the sets of cutters through an opening in a partition 58 in the drum 13 near the front end of the machine. They move the machine bodily according to the sweeps in the pole, so that the roughing cutters tend to follow the contour of the pole on the sweeps. As viewed in Fig. 2, the drum rotates clockwise and the cutters rotate counterclockwise on their own axes. Hence, both sets of cutters take spiral cuts around the moving pole as indicated in Fig. 1. The finishing or smoothing cutters engage the pole immediately behind the roughing cutters and follow its contour more closely than the roughing cutters because of their flexible spring mountings. The effect of centrifugal force and gravity on their movements is entirely eliminated, so that they cut substantially uniformly, entirely around and throughout the length of a pole.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; positively operated means for adjusting the cutter to trim poles of different diameters; and means between the cutter and the support to allow the cutter to move radially independently of its adjustment as it engages high and low places on the surface of the pole.

2. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; means for adjusting the cutter to trim poles of different diameters; lever means connecting the cutter to the support permitting the cutter to move radially of the pole independently of the support as it engages high and low places on the surface of the pole; and guide means to maintain the axis of rotation of the cutter substantially parallel with the axis of the pole as the cutter moves radially.

3. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; positively operated means for adjusting the cutter to trim poles of different diameters; a connection between the cutter and its support to allow the cutter to move radially independently of its adjustment as it engages high and low places on the surface of the pole; guide means on the support connected to maintain the cutter with its axis substantially parallel with the axis of the pole; and means to hold the cutter in cutting engagement with the pole.

4. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; mechanical means for adjusting the cutter to trim poles of different diameters; means on the support to allow the cutter to move radially of the pole as it engages high and low places on the surface while maintaining the axis of rotation of the cutter substantially parallel with the axis of the pole; and spring means associated with the cutter support to hold the cutter in engagement with the pole.

5. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; means for adjusting the cutter to trim poles of different diameters; means on the support permitting the cutter to move radially of the pole as it engages high and low places on the surface while maintaining the axis of rotation of the cutter substantially parallel with the axis of the pole; guide means associated and moving with the cutter to limit the depth of the cut; and a pair of cantilever springs on the support connected to hold the cutter in cutting engagement with the pole.

6. In a pole trimming machine having a rotatable casing mounted for universal and floating movement and means to guide a pole longitudinally through the machine imparting movement to the casing in response to sweeps and irregularities in the pole, a rotatable cutter having a support mounted for slidable radial adjustment within the casing and connected to rotate bodily therewith around the pole; means for adjusting the cutter to trim poles of different diameters; means on the support permitting the cutter to move radially of the pole as it engages high and low places on the surface while maintaining the axis of rotation of the cutter substantially parallel with the axis of the pole; a housing for the cutter having a guide to ride on the surface of a pole and serving as a depth gauge; and spring means cooperating with said housing to hold the cutter against the pole.

7. In a pole trimming machine having a horizontal, rotatable casing mounted for universal and floating movement and means to guide a pole longitudinally through the machine, imparting movement to the casing corresponding with sweeps and irregularities in the pole, a rotatable cutter having a support mounted for radial sliding movement within the casing and connected to rotate bodily therewith around the pole; means for adjusting the cutter to trim poles of different diameters; counterweighted pivoted levers on the support permitting radial movement of the cutter independently of its adjustment and overcoming the effect of gravity and centrifugal force on the cutter as it passes around the top and bottom portions of the pole; guiding means associated with the cutter support to maintain the axis of rotation of the cutter substantially parallel with the axis of the pole; and spring means connected to hold the cutter in engagement with the pole.

8. In a pole trimming machine having a horizontal, rotatable casing mounted for universal and floating movement and means to guide a pole longitudinally through the machine, imparting movement to the casing corresponding with sweeps and irregularities in the pole, a rotatable cutter having a support mounted for radial sliding movement within the casing and connected to rotate bodily therewith around the pole; means for adjusting the cutter to trim poles of different diameters; counterweighted pivoted levers on the support permitting radial movement of the cutter independently of its adjustment and overcoming the effect of gravity and centrifugal force on the cutter as it passes around the top and bottom portions of the pole; a housing for the cutter having an adjustable guide shoe adapted to ride on the surface of the pole and serving as a depth gauge; means on the cutter support and housing connected to maintain the axis of the cutter substantially parallel with the axis of the pole; and spring means connected to hold the cutter in engagement with the pole.

9. In a pole trimming machine having a horizontal rotatable casing mounted for universal and floating movement and means to guide a pole longitudinally through the machine, imparting movement to the casing corresponding with sweeps and irregularities in the pole, a rotatable cutter having a support mounted for radial sliding movement within the casing and connected to rotate bodily therewith around the pole; means for adjusting the cutter to trim poles of different diameters; counterweighted pivoted levers on the support permitting radial movement of the cutter independently of its adjustment and overcoming the effect of gravity and centrifugal force on the cutter as it passes around the top and bottom portions of the pole; a housing for the cutter having an adjustable guide shoe adapted to ride on the surface of the pole and presenting an opening through which the cutter projects whereby it serves as a depth gauge; a guide pin on the housing projecting radially of the axis of the pole on the opposite side of the cutter from the pole; a bearing member for said pin slidably mounted on the cutter support and connected to maintain the axis of rotation of the cutter substantially parallel with the axis of the pole; spring means to maintain said bearing member in its normal position; and a pair of cantilever springs on the support connected to hold the cutter in engagement with the pole.

10. In a pole trimming machine having a horizontal rotatable casing mounted for universal and floating movement and means to guide a pole longitudinally through the machine imparting movement to the casing in response to sweeps and irregularities in the pole, a rotatable cutter having a support mounted for radial sliding movement within the casing and adapted to rotate bodily therewith around the pole; means for adjusting the cutter to trim poles of different diameters and produce the desired taper; said support for the cutter including a crosshead connected to slide radially in the casing; a pair of counterweighted pivoted levers on the crosshead each pivotally connected at one end to the cutter unit to permit radial movement of the cutter independently of its adjustment; a radial guiding pin on said cutter support connected to maintain the axis of rotation of the cutter substantially parallel with the axis of the pole; a depth gauge associated with the cutter and arranged to engage and ride on the surface of the pole; and spring means connected to hold the gauge against the pole whereby the cutter will cut to a substantially uniform depth on high and low places on the surface of the pole.

11. In a pole trimming machine of the character described having a rotatable casing mounted for floating movement corresponding with sweeps and irregularities on the pole, a pair of diametrically opposed, motor-driven cutters having supports mounted for radial adjusting movement within the casing and confined to rotate bodily therewith around the pole; means for adjusting the cutters to trim poles of different diameters and to produce the desired tapers thereon; pivoted levers on the supports carrying the cutters and permitting radial movement thereof independently of their adjustments; counterweights on the pivoted levers for counterbalancing the cutters as they move radially to overcome the effect of gravity and centrifugal force on the cutters as they pass around the top and bottom portions of the pole; guiding means associated with the cutter supports to maintain the axes of rotation of the cutters substantially parallel with the axis of the pole; and spring means on the supports connected to hold the cutters in engagement with the pole.

12. In a pole trimming machine having a rotatable casing mounted for universal and floating movement and means to guide a pole longitudinally through the machine imparting movement to the casing in response to sweeps and irregularities in the pole, a pair of diametrically arranged, motor-driven cutters having supports mounted for slidable radial adjustment within the casing and confined to rotate bodily therewith around the pole; mechanical means for adjusting the cutters to trim poles of different diameters and to produce a predetermined taper; means on the supports to allow for movement of the cutters radially of the pole as they engage high and low places on the surface thereof, while maintaining the axes of rotation of the cutters substantially parallel with the axis of the pole; and spring means on the cutter supports connected to hold the cutters in engagement with the pole.

13. In a pole shaping machine having a rotatable casing mounted for universal and floating movement about a pole guided through the machine, a pair of rotary roughing cutters adjustably mounted in the casing also connected to rotate bodily around the pole; a pair of finishing cutters adjustably mounted in the casing behind the roughing cutters; and motor driven means connected to adjust both sets of cutters simultaneously to trim poles of different diameters and to produce a predetermined taper; and means connected between the finishing cutters and the motor driven means, whereby the finishing cutters may be moved independently of their motor driven adjustment and cut high and low places on the pole to a substantially uniform depth.

AUGUST M. DEITERS.
ELAM R. GILLON.